United States Patent [19]

Buecheler

[11] Patent Number: 4,943,458
[45] Date of Patent: Jul. 24, 1990

[54] HOLLOW PLASTIC BODY HAVING A GLOSSY SURFACE

[75] Inventor: Herbert Buecheler, Erkrath, Fed. Rep. of Germany

[73] Assignee: Henkel Kommanditgesellschaft auf Aktien, Duesseldorf, Fed. Rep. of Germany

[21] Appl. No.: 287,965

[22] Filed: Dec. 21, 1988

[30] Foreign Application Priority Data

Dec. 31, 1987 [DE] Fed. Rep. of Germany ....... 3744639

[51] Int. Cl.$^5$ ...................... B65D 23/00; B32B 27/32
[52] U.S. Cl. ................................. 428/35.7; 215/1 C; 215/12.1; 428/516
[58] Field of Search .............. 428/35.7, 516; 215/1 C, 215/12.1; 220/453, 468

[56] References Cited

U.S. PATENT DOCUMENTS

| | | | |
|---|---|---|---|
| 4,436,778 | 3/1984 | Dugal | 428/542.8 |
| 4,483,891 | 11/1984 | Lerny | 428/36.7 |
| 4,567,069 | 1/1986 | Jabarin | 428/516 |
| 4,708,896 | 11/1987 | Akao | 428/35.3 |
| 4,719,143 | 1/1988 | Jabarin | 428/516 |

FOREIGN PATENT DOCUMENTS 2528954 1/1976 Fed. Rep. of Germany .
1470947 4/1977 United Kingdom .

OTHER PUBLICATIONS

Encyclopedia of Polymer Science and Engineering, vol. 6, pp. 385–386.

*Primary Examiner*—James Seidleck
*Attorney, Agent, or Firm*—Ernest G. Szoke; Wayne C. Jaeschke; Daniel S. Ortiz

[57] ABSTRACT

The invention is a hollow body of plastic having a glossy surface, which is formed from a two-layer parison by an extrusion blow molding process, without need for exact temperature control during production, the hollow body being ecologically safe, inexpensive and, has a particularly glossy surface. The parison comprises a HDPE (high-density polyethylene) inner layer (5) and an unpigmented polyethylene outer layer (6) with additives.

7 Claims, 1 Drawing Sheet

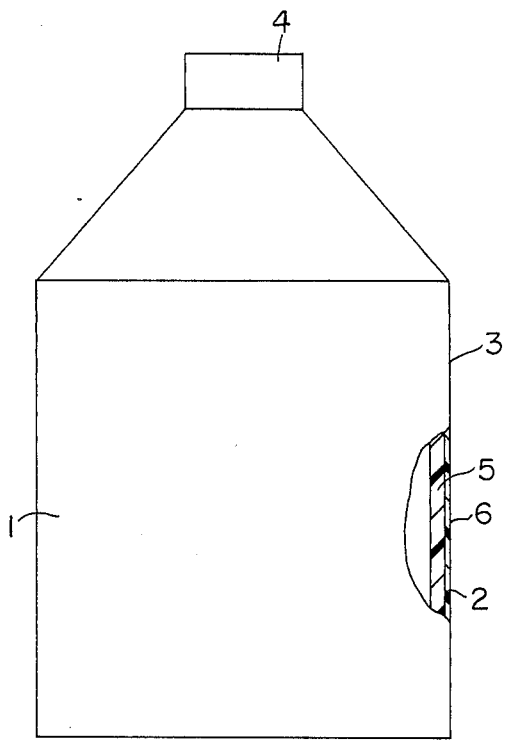

4,943,458

HOLLOW PLASTIC BODY HAVING A GLOSSY SURFACE

BACKGROUND OF THE INVENTION

1. Field of the Invention

This invention relates to a hollow plastic body having a glossy surface, which is formed from a two-layer parison by an extrusion blow molding process.

Hollow bodies are known, being used for example as a packaging material for dishwashing and laundry detergents. It is desirable that the outer surface of the hollow body create a clean, shiny impression to encourage customers to buy the detergent.

2. Statement of Rleated Art

A hollow body is known from DE-PS 25 28 954. DE-PS 25 28 954 describes an extruded hollow body of two thermoplastic layers, the outer plastic layer being extruded at a temperature above the blow molding temperature range of the plastic and the inner layer acting as a support layer. However, this hollow body has a sufficiently glossy surface only when an exact temperature can be maintained during its production. A satisfactory surface gloss cannot be obtained in the event of a minor deviation from the predetermined temperature.

SUMMARY OF THE INVENTION

Other than in the operating examples, or where otherwise indicated, all numbers expressing quantities of ingredients or reaction conditions used herein are to be understood as modified in all instances by the term "about".

It is an object of the present invention to provide a two-layer hollow plastic body, which is ecologically safe and inexpensive, and has a particularly glossy surface and can be readily produced without exact temperature control during its production.

According to the invention, a two layer hollow body is provided by forming the hollow body from a parison comprising an HDPE (high-density polyethylene) inner layer and an unpigmented polyethylene outer layer containing a lubricant.

It has unexpectedly been found that a two-layer hollow body can be obtained having a particularly glossy outer surface, in a simple manner, without need for particularly exact temperature control during its production. Preferably, the melt temperature of the outer layer during extrusion is selected so that it is below, or about the same as the melt temperature of the inner layer.

The gloss effect is particularly enhanced by addition to the outer layer of additives which regulate sliding behavior in filling machines. In addition, the constituent materials of the hollow body are ecologically compatible, inexpensive and have satifactory strength. The use of physically and chemically similar polymers ensures that the two-layer structure can be achieved without the use of a primer and remains intact for a long time without deterioration, for example through flaking of the outer layer. I. The polythylene inner and outer layer can include heat stabilizers, oxidation inhibitors, ultra violet light stabilizers and the like generally include in polyethylene fomulations.

BRIEF DESCRIPTION OF THE DRAWING

The FIGURE is a partially cutway elevational view of the hollow plastic body of the invention.

DETAILED DESCRIPTION OF THE INVENTION

In an preferred embodiment of the invention, the outer layer comprises LDPE (low-density polyethylene) or HDPE (high-density polyethylene), the density of the LDPE being from about 0.918 to 0.930 g/cm$^3$ and the density of the HDPE being from about 0.950 to 0.960 g/cm$^3$. It has been found that both materials are particularly useful since their physical-chemical structure is similar to that of the inner layer.

It has been found to be particularly advantageous to include as the lubricating additive an amide of a fatty acid and it is most preferred that the lubricating additive be oleic acid amide. With these lubricants, it is possible to obtain particularly good results in regard to strength properties and gloss effects.

In addition, it has been found to be particularly useful for the inner layer to comprise about 90% and the outer layer about 10% of the two-layer structure.

In another preferred embodiment of the invention, the inner layer is colored. The nature of this coloring determines the color of the hollow body. A particularly good gloss effect is obtained in conjunction with the colorless outer layer.

In a preferred embodiment of the invention, the hollow body is subjected to a flame pretreatment to smoothen the outer layer. Any craters formed in the surface of the outer layer during transport are removed by the flame pretreatment before labeling.

The invention is described by way of example with reference to the accompanying drawing in which the Figure diagrammatically illustrates one embodiment of the invention.

A hollow body 1 in the form of a bottle for a dishwashing or laundry detergent or the like comprises a wall 2, having an outer surface 3, and an opening 4.

The wall 2 comprises an inner layer 5 and an outer layer 6. The inner layer 5 comprises HDPE (high-density polyethylene) and the outer layer 6 comprises LDPE (low-density polyethylene) or HDPE (high-density polyethylene), the inner layer preferably making up 90% and the outer layer 10% of the wall 2 by weight. The outer layer 6 is colorless whereas the inner layer 5 can be colored by means of colored pigments. In addition, additives are incorporated in the outer layer 6, although this is not apparent from the drawing. By virtue of the two-layer structure of the outer wall 2, the outer surface 3 has a particularly clean and glossy effect. More particularly, this gloss effect is also enhanced by the incorporation of lubricating additives, the additives regulating sliding behavior in filling machines and improving the strength of the hollow bodies.

The hollow body 1 is formed by extrusion blow molding from a parison produced by coextrusion of the two polymers, the melt temperature of the outer layer 6 being lower than or about equal to the melt temperature of the inner layer 5.

After their production, the hollow bodies 1 are normally stored before filling and labeling. Mechanical stressing during transport of the hollow bodies 1 can cause damage, for example in the form of craters, in the outer layer 6 of the hollow body 1. These craters can be eliminated after filling of the hollow bodies 1 by a standard flame pretreatment carried out before labeling. A flame pretreatment is not only suitable for improving the adhesion of labels to the outer surface of hollow body 1, it also — surprisingly — eliminates damage to the outer layer 6 of hollow body 1.

The invention is not limited to the example of embodiment illustrated in the drawing. Further embodiments are possible without departing from the basic concept. In particular, the exact composition of the constituent material of the hollow body may be modified, and the hollow body can have a shape other than that illustrated.

I claim:

1. A two layer hollow plastic body, having a glossy unpigmented polyethylene outer surface layer, formed from a two-layer parison by a blow molding process, wherein the two layer hollow plastic body consists essentially of a high-density polyethylene inner layer (5) and an unpigmented low density polyethylene outer layer (6) containing additives.

2. A hollow body of claim 1 wherein the additive in the outer layer comprises a gloss enhancing lubrication composition.

3. A hollow body of claim 2 wherein the gloss enhancing lubricating composition comprises a fatty acid amide.

4. A hollow body of claim 3 wherein the amide is oleic acid amide.

5. A hollow body of claim 1 wherein the inner layer (5) makes up about 90% and the outer layer (6) about 10% of the two-layer structure by weight.

6. A hollow body as claimed in claim 1 wherein the inner layer (5) is pigmented.

7. A hollow body as claimed in claim 1 wherein the hollow body has been flame treated to smoothen the outer layer (6).

* * * * *